F. M. & A. B. BLACKMAN & D. T. GRIFFING.
Water-Carrying Truck.
No. 198,734. Patented Jan. 1, 1878.
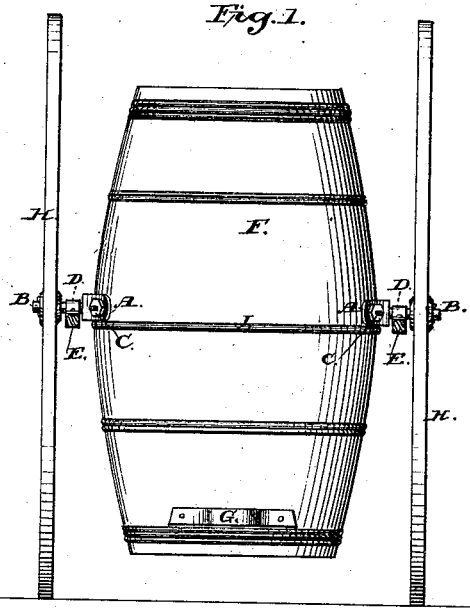
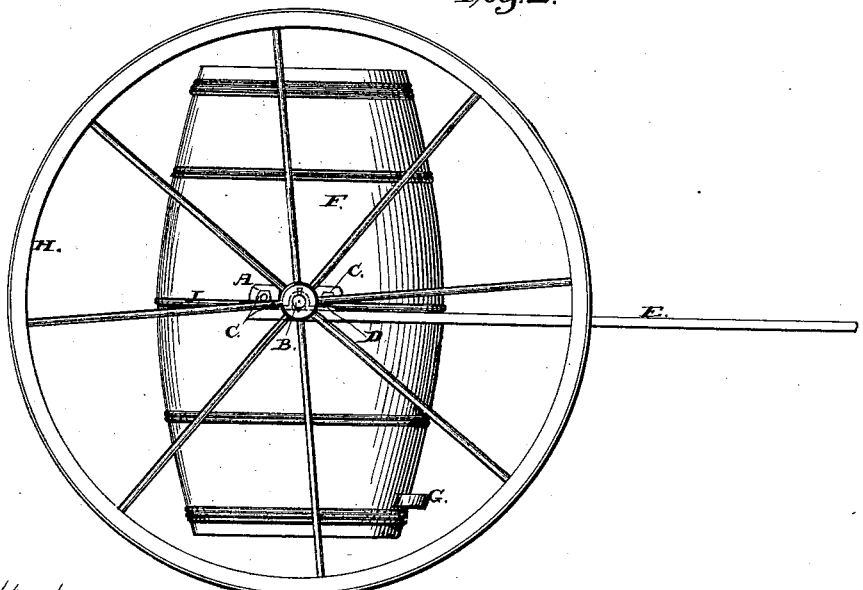

UNITED STATES PATENT OFFICE.

FRANCIS M. BLACKMAN, AUSTIN B. BLACKMAN, AND DAVID T. GRIFFING, OF DE KALB, ILLINOIS.

IMPROVEMENT IN WATER-CARRYING TRUCKS.

Specification forming part of Letters Patent No. 198,734, dated January 1, 1878; application filed August 20, 1877.

*To all whom it may concern:*

Be it known that we, FRANCIS M. BLACKMAN, AUSTIN B. BLACKMAN, and DAVID T. GRIFFING, of De Kalb, in the county of De Kalb and State of Illinois, have invented certain new and useful Improvements in Machines or Vehicles for Carrying Feed and Water to the animals or stock upon the farm or elsewhere, which improvements are fully set forth in the following specification, reference being had to the accompanying drawings, in which similar letters of reference indicate like parts in both figures.

The object of this invention is to provide a simple, efficient, and economical carriage or vehicle for the use of farmers and herdsmen in carrying feed or water to their horses, cattle, sheep, and other animals when desired; and it consists in attaching an arm or axle-tree to a barrel or other vessel, in such manner and of such construction that wheels and thills can be attached thereto, by means of which the vessel, when filled with water or feed, can be easily moved from one place to another, and at the same time retain its upright position, thereby preventing the spilling or dumping of the water or feed it contains during its passage, as will be more clearly hereinafter shown by reference to the said drawings, in which—

Figure 1 is a front view of carriage complete. Fig. 2 is a side view of the same.

A represents an iron plate, provided with holes for the admission of bolts C C, by means of which it is secured to the barrel or vessel F. To the plate A an arm, B, is attached; or the plate and arm may be made of one solid piece of iron, if desired. The arm B serves the purpose of an axle-tree, to which the wheels are secured, and upon which they revolve, and also admits of having the thills for drawing the carriage secured thereto, which is done by means of the clasps D D. These clasps are made to fit loosely upon the arm or axle B, so that they will turn or slide easily thereon. They are also provided with holes or openings, to admit and secure the thills E, which are used for moving the carriage. H represents the wheels of the carriage, and F the barrel or vessel in which the water or feed is placed to be moved. G represents a handle, secured to the barrel near the bottom, for dumping it. J is a hoop or band, firmly attached to the barrel at or near its center; or it may be secured to the plates A in such manner that the barrel may be taken out of the hoop and set into it again without injuring the carriage.

This apparatus is made by taking any ordinary barrel or vessel, and securing thereto the plates A, provided with its axle B, on either side, in the plane of its diameter, and a short distance above the center thereof, so that the lower part of the barrel or vessel may at all times be the heaviest, thereby keeping it in an upright position when hung upon the axles. The clasps D and wheels H are then placed upon the axles B, and secured by linchpins. The thills E are then introduced into the mortises or openings in the clasps D, and secured therein, thereby completing the machine or apparatus. The barrel, being hung upon the axles B, supported by the wheels, (the axles turning freely therein,) can be dumped or tipped, so as to discharge the feed or water in any desired quantity with ease by taking hold of the handle G.

We claim as our invention—

The apparatus hereinbefore described, consisting of plates A, provided with axles B, in combination with clasps D, shafts E, and barrel F, substantially as and for the purpose set forth.

FRANCIS M. BLACKMAN.
   AUSTIN B. BLACKMAN.
   DAVID T. GRIFFING.

Witnesses:
 BENJAMIN MURREY,
 WALTER LENOX.